(12) United States Patent
Mo et al.

(10) Patent No.: US 8,326,337 B2
(45) Date of Patent: *Dec. 4, 2012

(54) METHOD AND APPARATUS FOR RESPONDING TO A SCANNING REQUEST

(75) Inventors: Junxian Mo, Shenzhen (CN); David Comstock, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

This patent is subject to a terminal disclaimer.

(21) Appl. No.: 12/763,679

(22) Filed: Apr. 20, 2010

(65) Prior Publication Data

US 2010/0202411 A1   Aug. 12, 2010

Related U.S. Application Data

(63) Continuation of application No. PCT/CN2008/072297, filed on Sep. 8, 2008.

(30) Foreign Application Priority Data

Oct. 20, 2007   (CN) .......................... 2007 1 0181372

(51) Int. Cl.
*H04B 7/00* (2006.01)

(52) U.S. Cl. ........ 455/515; 455/436; 455/437; 455/438; 455/444

(58) Field of Classification Search ........... 455/436–445
See application file for complete search history.

(56) References Cited

U.S. PATENT DOCUMENTS

2006/0068823 A1 * 3/2006 Kwon et al. .................. 455/517

FOREIGN PATENT DOCUMENTS

CN   1794823 A   6/2006

OTHER PUBLICATIONS

IEEE 802.16e-2005: Part 16, tables 109h and 109i.*

* cited by examiner

*Primary Examiner* — Fayyaz Alam

(57) ABSTRACT

Methods and apparatus are provided to respond to a scanning request to further improve the utilization rate of air interface resources. A scanning response message is sent to a mobile station in response to a scanning request received from the mobile station. The scanning response message can be in the form of a MOB_SCN_RSP message that includes a BS ID sequence indication field that maps the BS IDs carried in the MOB_SCN_REQ message.

8 Claims, 6 Drawing Sheets

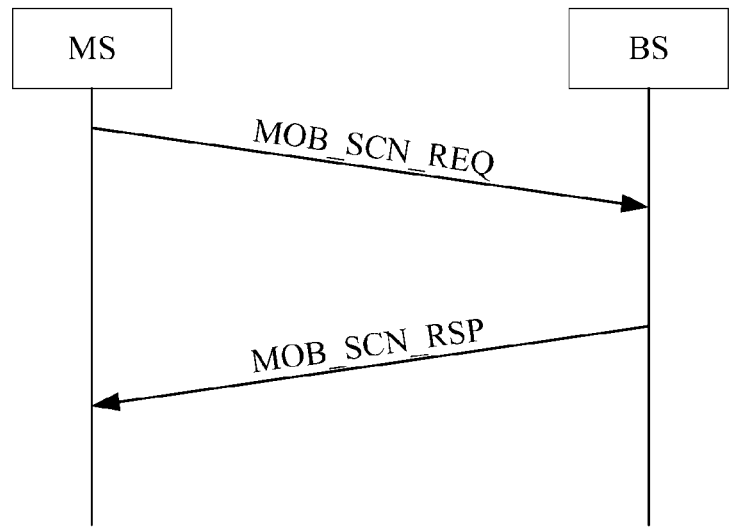

| Fields 1-3 | MSR Ind field | Fields 4-14 | Field D | Field A | Fields 15-18 | Field D | Field B | Fields 19-22 | Field D | Field F | Field E |

METHOD AND APPARATUS FOR RESPONDING TO A SCANNING REQUEST

CROSS-REFERENCE TO RELATED APPLICATIONS

This application is a continuation of International Application No. PCT/CN2008/072297, filed on Sep. 8, 2008, which claims the benefit of Chinese Patent Application No. 200710181372.9, filed on Oct. 20, 2007, both of which are hereby incorporated by reference in their entireties.

FIELD OF THE INVENTION

The present invention relates to a wideband radio access technology, and in particular, to a method and apparatus for responding to a scanning request.

BACKGROUND OF THE INVENTION

A worldwide interoperability for microwave access (WIMAX) system, also called an 802.16 wireless metropolitan area network (MAN), can cover data communication areas of 25 to 30 square miles.

The WIMAX technology is based on wideband radio standards among 802.16 series proposed by the Institute of Electrical and Electronics Engineers (IEEE). So far, the IEEE 802.16 series include seven standards: IEEE 802.16, IEEE 802.16a, IEEE 802.16c, IEEE 802.16d, IEEE 802.16e, IEEE 802.16f, and IEEE 802.16g. IEEE 802.16, IEEE 802.16a, and IEEE 802.16d are fixed radio access air interface standards, while IEEE 802.16e is a mobile wideband radio access air interface standard. WIMAX uses IEEE 802.16e as the air interface protocol.

IEEE 802.16e is compatible with earlier IEEE 802.16d. IEEE 802.16e and IEEE 802.16d are the same in physical layer implementation mode, and have the following difference: IEEE 802.16e has extended orthogonal frequency division multiple access (OFDMA) to meet different carrier bandwidth requirements. To support mobility, IEEE 802.16e introduces a number of new features in the media access control layer (MAC). By introducing new technologies such as orthogonal frequency division multiplex (OFDM) and multiple input multiple output (MIMO), the radio access technology develops towards higher capacity, wider coverage and mobility for a wideband radio system. The radio access technology coexists with and supplements the 3G network technology. Thus, the IEEE 802.16e technology has been a hot topic in the industry since its emergence.

Based on IEEE 802.16e, WIMAX proposes a new enhanced technology—IEEE 802.16m. Currently, IEEE 802.16m specifies the following requirements: Mobile objects at the speed of 350 kilometers per hour are supported; the maximum downlink data transmission rate should be over 350 Mbps; the uplink data transmission rate should not be smaller than 200 Mbps; the bandwidth ranges from 5 MHz, 10 MHz, 20 MHz to 40 MHz; and a maximum of 4×4 MIMOs can be used. When a 20 MHz bandwidth is used and communications are based on time division duplex (TDD), IEEE 802.16m requires that the downlink data transmission rate should be 40 Mbps and the uplink data transmission rate should be over 12 Mbps. In addition, IEEE 802.16m requires that the link layer access duration and handover delay should be less than 10 ms and 20 ms, respectively. Furthermore, IEEE 802.16m should be compatible with IEEE 802.16e.

The WIMAX system consists of base stations (BSs) and mobile stations (MSs). A BS communicates with an MS through electromagnetic waves transmitted and received by a radio transceiver. Each BS has a unique base station identity (BS ID), which is a 48-bit field. Each BS has its coverage, and may communicate with each BS in its coverage. Each BS sends a neighbor cell broadcast (MOB_NBR_ADV) message to BSs and MSs in a certain area on a timed basis, and stores the MOB_NBR_ADV message. The MSs receive and store the MOB_NBR_ADV message. The MOB_NBR_ADV message comprises BS IDs of the BSs in a certain area, where the BS IDs are arranged in sequence in the MOB_NBR_ADV message. Each BS may communicate with multiple MSs in its coverage at the same time. However, one MS can communicate with only one BS at the same time, and the BS is the serving BS of the MS. As the MS moves relative to the BS, the MS may go through coverage areas of multiple BSs. In this case, the serving BS of the MS may be changed. During the movement, the MS may use a different BS that meets communication quality requirements as its serving BS to continue its communications. This process is known as handover. To ensure the continuity of communications and reduces possible interruptions of communications due to the handover, the MS needs to detect the signal quality of each adjacent BS to determine a target BS for handover when maintaining normal communications with the current serving BS. This detection process is called scanning. In this way, the MS may be handed over to a new BS with better communication quality when handover is required. Thus, the scanning process is a key step to ensure smooth handover.

FIG. 1 shows a scanning process in the prior art. The scanning process message includes a mobile scanning response (MOB_SCN_RSP) and a mobile scanning request (MOB_SCN_REQ). A MOB_SCN-RSP message shall be transmitted by the BS either unsolicitedly or in response to a MOB_SCN-REQ message sent by an MS. By sending the MOB_SCN_RSP message, the BS notifies the MS receiving the MOB_SCN_RSP of the scanning start time, scanning type and BS ID of a BS to be scanned.

Both the MOB_SCN_RSP message and the MOB_SCN_REQ message include BS ID information. By carrying the BS ID information in the MOB_SCN_RSP message, the BS notifies the MS receiving the MOB_SCN_RSP message of which BSs are to be scanned. By carrying the BS ID information in the MOB_SCN_REQ message, the MS notifies its serving BS of which BSs are to be scanned. The MOB_SCN_RSP message and the MOB_SCN_REQ message also carry a scanning type field. Each BS ID in the MOB_SCN_RSP message and the MOB_SCN_REQ message corresponds to a scanning type.

In the prior art, the BS ID information in the MOB_SCN_RSP message and the MOB_SCN_REQ message is divided into two parts. The first part of BS ID information in the MOB_SCN_REQ message corresponds to the BS IDs included in an MOB_NBR_ADV message sent by the serving BS of an MS that sends the MOB_SCN_REQ message, and the second part is the IDs of BSs that are unsolicitedly scanned by the MS but not included in the MOB_NBR_ADV message. One part of the BS ID information in the MOB_SCN_RSP message corresponds to the BS IDs included in an MOB_NBR_ADV message of a BS that sends the MOB_SCN_RSP message, and the second part is full base station identities (Full BS IDs) sent by the BS, where each full BS ID is represented by 48 bits. Among the second part of BS IDs in the MOB_SCN_RSP message, some are sent by the BS to respond to the MOB_SCN_REQ message, and some are unsolicitedly scanned by the BS but not included in the MOB_SCN_REQ message.

Among the BS IDs in the scanning message, the part included in the MOB_NBR_ADV is represented in BS Index mode in IEEE 802.16e. That is, each of the BS IDs is represented by its sequence in the MOB_NBR_ADV message. The second part in the scanning message is represented in Full BS ID mode.

The number of BS IDs in the MOB_NBR_ADV message is usually smaller than 255. Thus, only 8 bits are needed in BS Index mode, while 48 bits are needed in Full BS ID mode. Compared with the Full BS ID mode, the BS Index mode saves 40 bits per BS requesting the scanning.

IEEE 802.16e uses the Full BS ID mode rather than the BS Index mode to represent the second part of the BS IDs because these BS IDs are not included in the MOB_N-BR_ADV.

FIG. 2 shows a format of an MOB_SCN_REQ message in the prior art.

The MOB_SCN_REQ message is composed of fields, each of which is represented by a number or letter. The following describes each field.

Field 1 is a management message type field of 8 bits.
Field 2 is a scan duration field of 8 bits.
Field 3 is an interleaving interval field of 8 bits.
Field 4 is a scan iteration field of 8 bits.
Field 5 is an N_Recommended_BS_Index field of 8 bits. This field indicates the number of BS IDs that the MS intends to scan and that are included in the MOB_NBR-ADV message.
Field 6 is a "Configuration change count for MOB_NBR-ADV" field of 8 bits.
Field 7 is a Neighbor_BS_Index field of 8 bits. This field indicates the sequence of a BS ID that the MS intends to scan in the MOB_NBR_ADV message.
Field 8 is a reserved field of 1 bit.
Field 9 is a scanning type field of 3 bits. This field indicates the scanning type of the BS ID information mapped by field 7. The scanning type comprises scanning type 0, scanning type 1, scanning type 2, and scanning type 3.
Field 10 is an N_Recommended_BS_Full field of 8 bits. This field indicates the number of BSs that the MS intends to scan.
Field 11 is a Recommend BS ID field of 48 bits. This field indicates BS IDs of the BSs that the MS intends to scan.
Field 12 is a reserved field of 1 bit.
Field 13 is a scanning type field of 3 bits. This field indicates the scanning types of the BS IDs mapped by field 11.

When the value of field 5 is 0, fields 6-9 and field A are nonexistent.

Field A includes repeated contents of fields 7-9 in turn. The number of repetitions is equal to the value of field 5.

Field B includes repeated contents of fields 11-13 in turn. The number of repetitions is equal to the value of field 10.

Field C indicates one of other fields in the MOB_SCN_REQ message.

FIG. 3 shows a format of an MOB_SCN_RSP message in the prior art. The format of the MOB_SCN_RSP message is represented in the same way as that shown in FIG. 2. Fields 1-14 are 14 fields that are represented by numbers and arranged in ascending order, while fields 15-18 are four fields that are represented by numbers and arranged in ascending order. The following describes each field shown in FIG. 3.

Field 1 is a management message type field of 8 bits.
Field 2 is a scan duration field of 8 bits.
Field 3 is a report mode field of 2 bits.
Field 4 is a reserved field of 6 bits.
Field 5 is a report period field of 8 bits.
Field 6 is a report metric field of 8 bits.
Field 7 is a start frame field of 8 bits.
Field 8 is an interleaving interval field of 8 bits.
Field 9 is a scan iteration field of 8 bits.
Field 10 is an N_Recommended_BS_Index field of 8 bits. This field indicates the number of BS IDs that the BS intends to scan and that are included in the MOB_NBR-ADV message.

Fields 11-14 correspond to fields 6-9 shown in FIG. 2 in terms of content and meaning Field D between field 14 and field A is 24 bits long and is present only when the scanning type of field 14 is scanning type 2 or scanning type 3.

Field A shown in FIG. 3 includes repeated contents of fields 12-14 and field D in turn. The number of repetitions is equal to the value of field 11. Field D is located between field 14 and field A.

Field 15 is an N_Recommended_BS_Full field of 8 bits. This field indicates the number of BSs that the BS intends to scan and that are not included in the MOB_NBR_ADV message.

Field 16 is a Recommended BS ID field of 48 bits. This field indicates the BS IDs that the MS intends to scan and that are not included in the MOB_NBR_ADV message.

Field 17 is a reserved field of 1 bit.
Field 18 is a scanning type field of 3 bits. This field indicates the scanning types of the BS IDs in field 16.

Field D between field 18 and field B is 24 bits long and is present only when the scanning type of field 18 is scanning type 2 or scanning type 3.

Field B shown in FIG. 3 includes repeated contents of fields 16-18 and field D in turn. The number of repetitions is equal to the value of field 15. Field D is located between field 18 and field B.

Field E indicates one of other fields in the MOB_SC-N_RSP message.

SUMMARY OF THE INVENTION

Embodiments of the present invention provide a method and apparatus for responding to a scanning request to further improve the utilization rate of air interface resources.

A method for responding to a scanning request in an embodiment of the present invention comprises:
receiving a mobile scanning request MOB_SCN_REQ from an MS; and
responding to the MOB_SCN_REQ message by sending a mobile scanning response MOB_SCN_RSP to the MS, where:
the MOB_SCN_RSP message comprises a BS ID sequence indication field that maps the BS IDs carried in the MOB_SCN_REQ message.

An apparatus for responding to a scanning request in an embodiment of the present invention includes: a receiving unit, adapted to receive an MOB_SCN_REQ message; a sequence indicating unit, adapted to map the BS IDs in the MOB_SCN_REQ message; and a sending unit, adapted to send the MOB_SCN_RSP message according to the mapping.

According to the method provided in an embodiment of the present invention, a BS ID sequence indication field is set in the MOB_SCN_RSP message; and the BS ID sequence indication field is used to map the BS IDs carried in the MOB_SCN_REQ message. Thus, a BS ID may be mapped by using a field of less than 48 bits. Compared with the Full BS ID in the prior art, the method provided in an embodiment of the present invention can further improve the utilization rate of air interface resources. A sequence indicating unit is also set in the apparatus provided in an embodiment of the present invention, which also improves the utilization rate of air interface resources.

BRIEF DESCRIPTION OF THE DRAWINGS

For better understanding of the technical solution provided in the embodiments of the present invention or in the prior art, the following describes the accompanying drawings that are used in the embodiments of the present invention or in the prior art. Obviously, the following drawings are some exemplary embodiments of the present invention only. Those skilled in the art may obtain other drawings based on the following drawings without creative work.

FIG. 1 shows a scanning process in the prior art;

FIG. 2 shows a format of an MOB_SCN_REQ message in the prior art;

FIG. 3 shows a format of an MOB_SCN_RSP message in the prior art;

DETAILED DESCRIPTION OF THE INVENTION

Figures 4, 5:
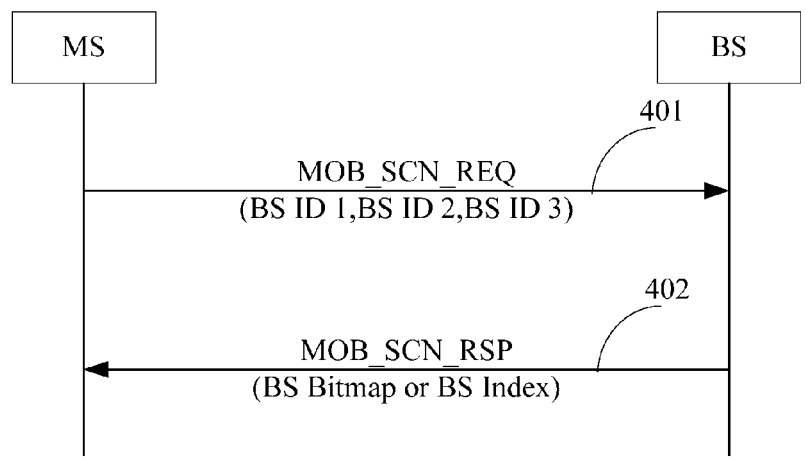
FIG. 4 shows a scanning process provided in a first embodiment of the present invention.
FIG. 5 shows a format of an MOB_SCN_RSP message in BS Index mode provided in the first embodiment of the present invention.

During the implementation of the present invention, the inventor discovers at least the following problems in the prior art:

Because one part of the BS IDs in a scanning process message may correspond to the BS IDs in the MOB_NBR_ADV message, this part of the BS IDs is represented in BS Index mode in the prior art. When the BS IDs are represented in BS Index mode, each BS needs 8 bits only; when the BS IDs are represented in Full BS ID mode, each BS needs 48 bit. Thus, if the first part of the BS IDs is represented in BS Index mode, the utilization rate of air interface resources is improved. However, the second part of the BS IDs is still represented in Full BS ID mode, which consumes high air interface resources. Because the air interface resources are valuable, how to improve the utilization rate of air interface resources is still an urgent problem to be solved for the wideband radio access system.

The technical solution of the present invention is hereinafter described in detail with reference to the accompanying drawings. It is evident that the embodiments are only exemplary embodiments of the present invention and the present invention is not limited to such embodiments. Other embodiments that those skilled in the art obtain based on embodiments of the present invention without creative work also fall in the scope of protection of the present invention.

For better understanding of the objective, technical solution and merits of the present invention, the present invention is hereinafter described in detail with reference to accompanying drawings and exemplary embodiments.

First embodiment: After receiving an MOB_SCN_REQ message from the MS, the BS sends an MOB_SCN_RSP message to the MS, responding to the scanning request of the MS.

Among the BS IDs in the MOB_SCN_RSP message, the first part corresponds to the BS IDs included in the MOB_NBR_ADV message sent by the BS; the second part is sent by the BS to respond to the MOB_NBR REQ message; the third part is the BS IDs that the BS intends to scan and that are not included in the MOB_SCN_REQ message. The second part of the BS IDs is already carried in the MOB_SCN_REQ message and is sequenced. For the second part of the BS IDs, the first embodiment optimizes the MOB_SCN_RSP message as follows: A BS ID sequence indication field is set to map the second part of the BS IDs. The BS ID sequence indication field may be set in BS Index mode or in BS Bitmap mode. In BS Index mode, the BS ID sequence indication field is set to a BS Index field; in BS Bitmap mode, the BS ID sequence indication field is set to a BS Bitmap field.

The second part of the BS IDs sent by the BS to respond to the MOB_SCN_REQ message may be set in two modes. First, the BS responds to all BS IDs carried in the MOB_SCN_REQ message, where all the BS IDs include BS IDs mapped in Full BS ID mode and in other modes; second, the BS responds to the BS IDs that are mapped in Full BS ID mode and carried in the MOB_SCN_REQ message.

The following describes the method provided in the first embodiment based on the first mode.

FIG. 4 shows a scanning process in which the BS responds to an MOB_SCN_REQ message sent from the MS according to the method provided in the first embodiment of the present invention.

Step 401: The MS sends to the BS an MOB_SCN_REQ message in which the carried BS IDs are arranged in sequence. For example, if the MOB_SCN_REQ message carries a total of three BS IDs, the BS IDs are arranged as follows: BS ID1, BS ID2, BS ID3.

Step 402: After receiving the MOB_SCN_REQ message from the MS, the BS sends an MOB_SCN_RSP message to the MS, where the MOB_SCN_RSP message maps all the BS IDs carried in the MOB_SCN_REQ message in BS Bitmap mode or BS Index mode.

The BS Index mode provided in the first embodiment is the same as that in the prior art except for the following difference: The sequence in BS Index mode provided in the first embodiment is the sequence of the BS IDs that are already carried in the MOB_SCN_REQ message. In BS Index mode, the BS IDs carried in the MOB_SCN_REQ message are mapped as follows by using the BS Index field: Each BS ID has an index to indicate the sequence, and is identified by the index. For example, if the index of a BS ID is 1 in the MOB_SCN_REQ message, 1 is used to identify the BS ID in the MOB_SCN_RSP message. In BS Index mode, the value of the BS Index field is set to the index to map the BS ID. In the first embodiment, only 8 bits are needed to map a BS ID in BS Index mode. In contrast, 48 bits are needed in Full BS ID mode in the prior art.

In this embodiment, a BS Bitmap field is set in the MOB_SCN_RSP message to represent the second part of the BS IDs in the MOB_SCN_RSP message in BS Bitmap mode. The BS Bitmap field maps the BS ID. Preferably, the number of bits in the BS Bitmap field is equal to the total number of BS IDs in the MOB_SCN_REQ message. Each bit in the BS Bitmap is mapped to a BS ID among all the BS IDs. The sequence of bits in the BS Bitmap field is mapped to the sequence of all the BS IDs. For example, the first bit in the BS Bitmap field is mapped to the first BS ID among all the BS IDs. Each bit in the BS Bitmap field uses 0 or 1 to indicate whether to request to scan a BS represented by the BS ID that is mapped to the bit. For example, if a bit in the BS Bitmap field is set to 1 according to an agreement, the BS requests to scan a BS represented by the BS ID that is mapped to the bit.

In practical applications, the number of bits in the BS Bitmap field may be smaller than the total number of BS IDs. In this case, a bit in the BS Bitmap field is mapped to multiple BS IDs among all the BS IDs. That is, when the MOB_SCN_RSP message has one or multiple BS IDs, the bit mapped to multiple BS IDs is set to an agreed value. The number of bits in the BS Bitmap field may also be greater than the total number of BS IDs. In this case, multiple bits in the BS Bitmap field are mapped to a BS ID among all the BS IDs. When the number of bits in the BS Bitmap field is smaller or greater than the total number of BS IDs, the BS Bitmap field may be used with reference to the scenario where the number of bits in the BS Bitmap field is equal to the total number of BS IDs in the MOB_SCN_REQ message. A reserved bit may also be set in the BS Bitmap field, which is not used to map all the BS IDs.

To map the BS IDs, the BS Bitmap field may map all the BS IDs or part of the BS IDs that the MS requests to scan. For the specific mapping method in these two modes, refer to related descriptions of embodiments of the present invention. For the mapping between the BS index field and the BS IDs, refer to related descriptions of the mapping between the BS Bitmap field and the BS IDs.

Compared with the Full BS ID mode in the prior art in which 48 bits are needed, only one bit is needed to map a BS ID in BS Bitmap mode.

In the preceding first mode, the index in BS Index mode is the index of the BS ID among all the BS IDs.

When the BS Index mode is used in the second mode, the index of a BS ID is the index of the Full BS ID among all the BS IDs mapped in Full BS ID mode in an MOB_SCN_REQ message. Preferably, when the BS Bitmap mode is used, the number of bits in the BS Bitmap field is equal to the number of BS IDs mapped in Full BS ID mode in the MOB_SCN_REQ message. In the preceding second mode, the BS Index mode and the BS Bitmap mode may be used with reference to the first mode, and will not be further described.

Preferably, a carrying indication field is set in a current MOB_SCN_RSP message to indicate whether the MOB_SCN_RSP message comprises BS IDs that are already carried in an MOB_SCN_REQ message. This indication field may use one of six bits reserved in the current MOB_SCN_RSP message, one of other fields in the current MOB_SCN_RSP message or a new field with a variable length. The carrying indication field is optional. Without the carrying indication field, the MOB_SCN_RSP message may also use the BS Bitmap mode or BS Index mode directly.

FIG. 5 shows a format of an MOB_SCN_RSP message in BS Index mode.

Compared with FIG. 3, FIG. 5 has the following differences: An MSR Ind field is inserted between field 3 and field 4; fields 19-22, field D and field F are inserted between field B and field E. The following describes each field shown in FIG. 5.

Fields 1-3, fields 4-14, field A, field D between field 14 and field A, and field E shown in FIG. 5 are the same as those fields with the same labels and relative positions shown in FIG. 3 in terms of contents and meanings. Compared with the fields with the same labels and relative positions shown in FIG. 3, fields 15-18, field B and field D between field B and field 18 shown in FIG. 5 have only the following difference: The BS IDs in those fields shown in FIG. 5 are BS IDs that a BS intends to scan, that is, the third part of BS IDs.

In FIG. 5, field 19 is used to map the number of BS IDs that are already carried in the MOB_SCN_REQ message and should be carried in the MOB_SCN_RSP message, that is, the number of the second part of BS IDs. Field 19 is 8 bits long; field 20 is an index of the BS ID in the MOB_SCN_REQ message and is 8 bits long; field 21 is a reserved field of 1 bit; field 22 indicates a scanning type of the BS ID mapped in field 20; field D between field 22 and field F is 24 bits long and is present only when the scanning type is scanning type 2 or scanning type 3; field F is used to repeat the contents in fields 19-22 and field D, and the number of repetitions is equal to the value of field 19.

The MSR Ind field is the carrying indication field, which is used to indicate whether the MOB_SCN_RSP message comprises BS IDs that are already carried in the MOB_SCN_REQ message. For example, when the value of the MSR Ind field is agreed to be 1, the MOB_SCN_RSP message comprises BS IDs that are already carried in the MOB_SCN_REQ message. If the value of the MSR Ind field is agreed to be 1, fields 19-22, field F, and field D between field F and field 22 are present; otherwise these fields are nonexistent.

Figure 6:
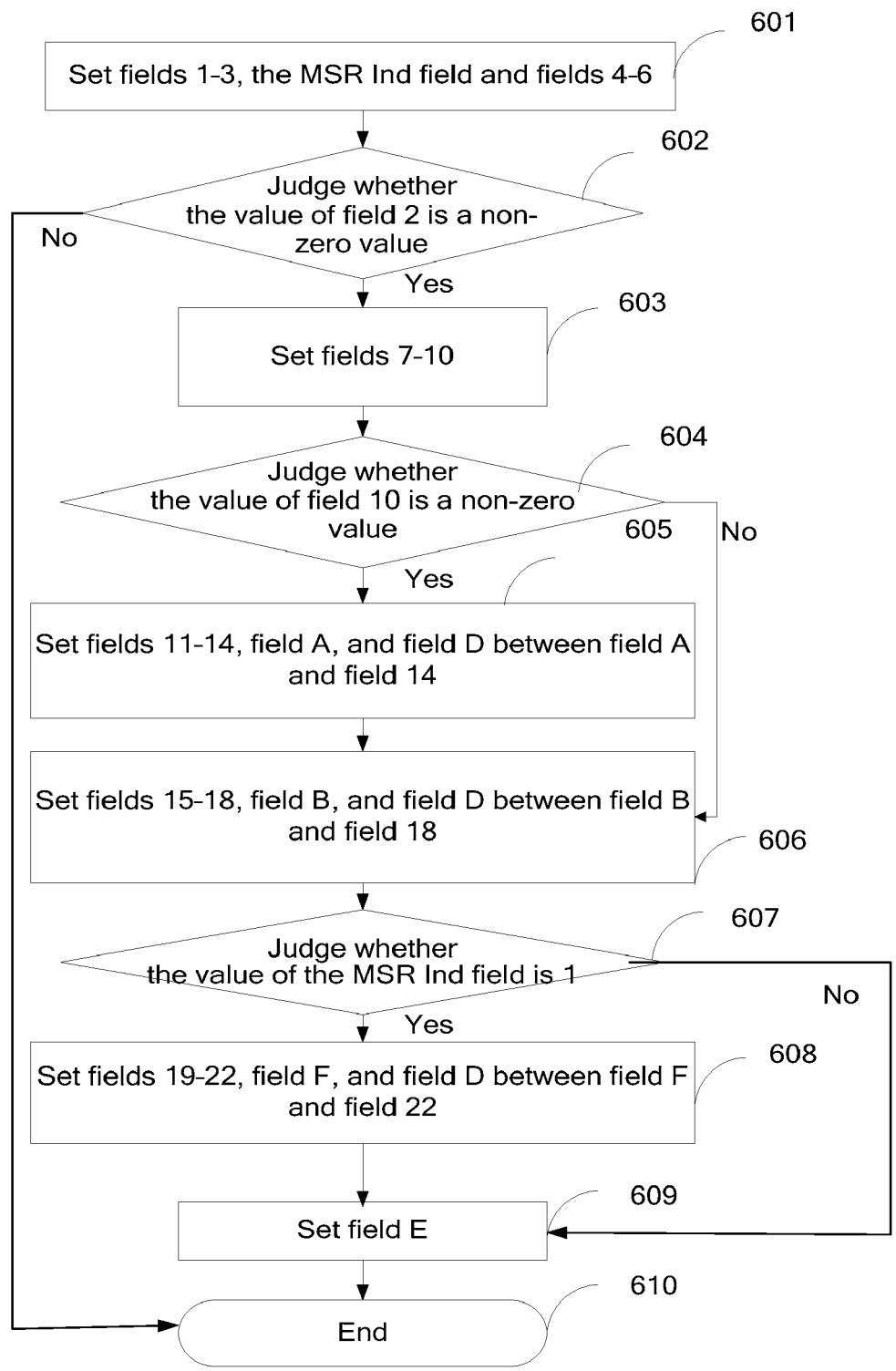
FIG. 6 shows a process of setting the MOB_SCN_RSP message in FIG. 5.

FIG. 6 shows a process of setting the format of an MOB_SCN_RSP message.

Step 601: Set fields 1-3, the MSR Ind field, and fields 4-6.
Step 602: Judge whether the value of field 2 is a non-zero value; if so, proceed to step 603; otherwise, go to step 610.
Step 603: Set fields 7-10.
Step 604: Judge whether the value of field 10 is a non-zero value; if so, proceed to step 605; otherwise, go to step 606.
Step 605: Set fields 11-14, field A, and field D between field A and field 14.
Step 606: Set fields 15-18, field B, and field D between field B and field 18.
Step 607: Judge whether the value of the MSR Ind field is 1; if so, proceed to step 608; otherwise, go to step 609.
Step 608: Set fields 19-22, field F, and field D between field F and field 22.
Step 609: Set field E.
Step 610: The setting process ends.

For the method for setting each field shown in FIG. 6, refer to related descriptions of embodiments of the present invention, and the method will not be further described.

In FIG. 5 and FIG. 6, the carrying indication field MSR Ind may use one of six bits reserved in the MOB_SCN_RSP message. In practical applications, the MSR Ind field may use one or multiple bits among other bits or a new field with a variable length in the MOB_SCN_RSP message.

When the second part of the BS IDs in the MOB_SCN_RSP message is represented in BS Bitmap mode, the difference between the format of the MOB_SCN_RSP message and that shown in FIG. 5 is as follows: Fields 19-22 shown in FIG. 5 are replaced with the BS Bitmap field; field D between field F and field 22 shown in FIG. 5 is replaced with the BS Bitmap scanning type field; and field F is present only when the BS Bitmap scanning type field comprises scanning type 2 or scanning type 3.

For the method for setting the BS Bitmap field, refer to related descriptions of embodiments of the present invention.

Bits in the BS Bitmap scanning type field indicate a scanning type. Starting from the initial bit of the scanning field, every 3 bits indicate a scanning type. The sequence of scanning types corresponds to the values and sequences of bits in the BS Bitmap field. This is described in detail with reference to FIG. 7.

Figure 7:
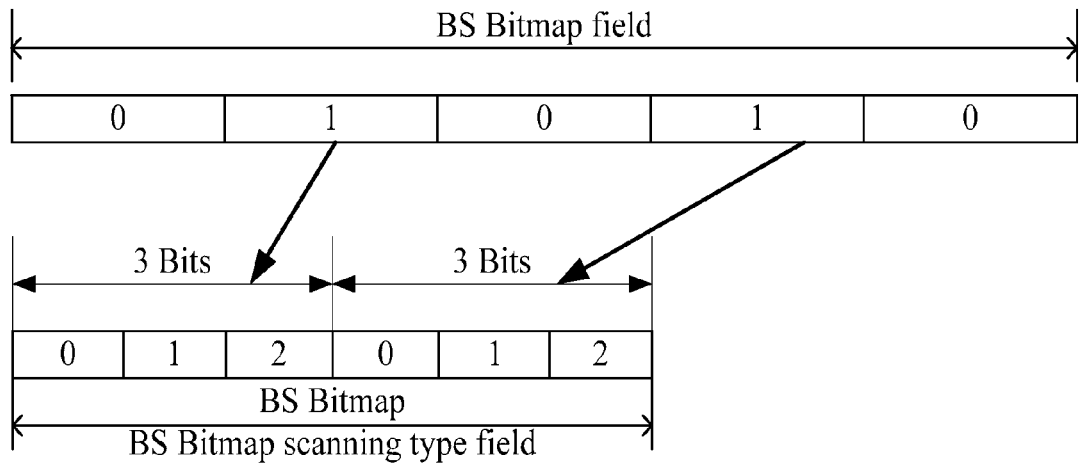
FIG. 7 shows a mapping relation between a BS Bitmap scanning type field and a BS Bitmap field provided in the first embodiment of the present invention.

The BS Bitmap field in FIG. 7 is 5 bits long, and indicates that the number of BS IDs carried in the MOB_SCN_REQ message is 5. The first bit in FIG. 7 corresponds to the first BS ID in the MOB_SCN_REQ message, and the rest of bits correspond to the rest of BS IDs in the MOB_SCN_REQ message in turn. In FIG. 7, when the value of a bit is 1, the BS requests to scan a BS represented by a BS ID that is mapped to the bit, and the bit corresponds to a 3-bit scanning type field. Scanning types that correspond to each bit whose value is 1 in the BS Bitmap field are arranged in the sequence of the bits. As shown in FIG. 7, the values of the second bit and the fourth bit in the BS Bitmap field are 1. Thus, the scanning type that corresponds to the second bit is represented by the first 3 bits in the BS Bitmap scanning type field, while the scanning type that corresponds to the fourth bit is represented by the second 3 bits in the BS Bitmap scanning type field. In the BS Bitmap scanning type field shown in FIGS. 7, 0, 1 and 2 indicate that the bit is bit 0, bit 1 and bit 2 in the 3 bits.

If the second part of BS IDs in the MOB_SCN_RSP message uses the BS Bitmap mode, the process of setting the MOB_SCN_RSP message is similar to that shown in FIG. 6 except that step 608 is changed as follows:

Set the BS Bitmap field, BS Bitmap scanning type field and field F.

In this embodiment, the MOB_SCN_RSP message is optimized. For BS IDs that are already carried in the MOB_SCN_REQ message, the BS Index mode or BS Bitmap mode is used in the MOB_SCN_RSP message to map the BS IDs. In BS Index mode, only 8 bits are needed to map each BS ID; in BS Bitmap mode, at least one bit is needed to map each BS ID. In current Full BS ID mode, 48 bits are needed to map each BS ID. Thus, the method provided in this embodiment of the present invention may greatly improve the utilization rate of air interface resources.

Second embodiment: A message ID field is set in a scanning process message to identify each scanning process message, so that the MOB_SCN_REQ matches the MOB_SCN_RSP message. When multiple scanning processes are available at a time, the message ID field may specify which MOB_SCN_REQ message matches an MOB_SCN_RSP message. Thus, the message ID field may be used to match the MOB_SCN_REQ message with the MOB_SCN_RSP message. The message ID field may be named "Configuration change count for MOB_SCN_REQ", "Transaction ID" or "Sequence Number". The length of the message ID field may be 1-32 bits or more. The message ID field may be a new field with a variable length, an existing field, or one or multiple bits of an existing field in the scanning process message.

The following gives an example to describe how to use the message ID field. Supposing the message ID field is 2 bits long, the message ID field may match four pairs of scanning process messages because 2 bits may represent four numbers, that is, 0-3. The specific matching method is as follows: A message ID field is set in an MOB_SCN_REQ message and an MOB_SCN_RSP message; when the value of the message ID field in the MOB_SCN_RSP message is the same as that in the MOB_SCN_REQ message, the MOB_SCN_RSP message matches the MOB_SCN_REQ message. For example, when an MS sends an MOB_SCN_REQ message, the MS sets the ID field in the MOB_SCN_REQ message to 1; after a BS receives the MOB_SCN_REQ message, the BS sends an MOB_SCN_RSP message, and also sets the message ID field in the MOB_SCN_RSP message to 1, which specifies that the MOB_SCN_RSP message matches the MOB_SCN_REQ message with the ID 1.

A message ID field is added to a scanning process message to specify which MOB_SCN_REQ message matches an MOB_SCN_RSP message. In this case, errors may be avoided when the method provided in the first embodiment of the present invention is used to scan. The reasons are as follows: If the message ID field is not included in the scanning process message, the MOB_SCN_RSP message matches a latest MOB_SCN_REQ message that the MS sends according to the prior art; however, after the MS sends an MOB_SCN_REQ message actively, a BS does not receive the message due to transmission errors; in this case, the BS sends an MOB_SCN_RSP message to the MS actively, but the MS cannot judge whether the MOB_SCN_RSP matches the MOB_SCN_REQ message or is sent by the BS actively. In this embodiment, the preceding errors are avoided because a message ID field is used to match the scanning process messages.

After a message ID field is added to the scanning process messages, the preceding errors are avoided and multiple scanning processes may be initiated by the MS or BS. The following describes this embodiment in detail, supposing the MS initiates multiple scanning processes.

Figure 8:
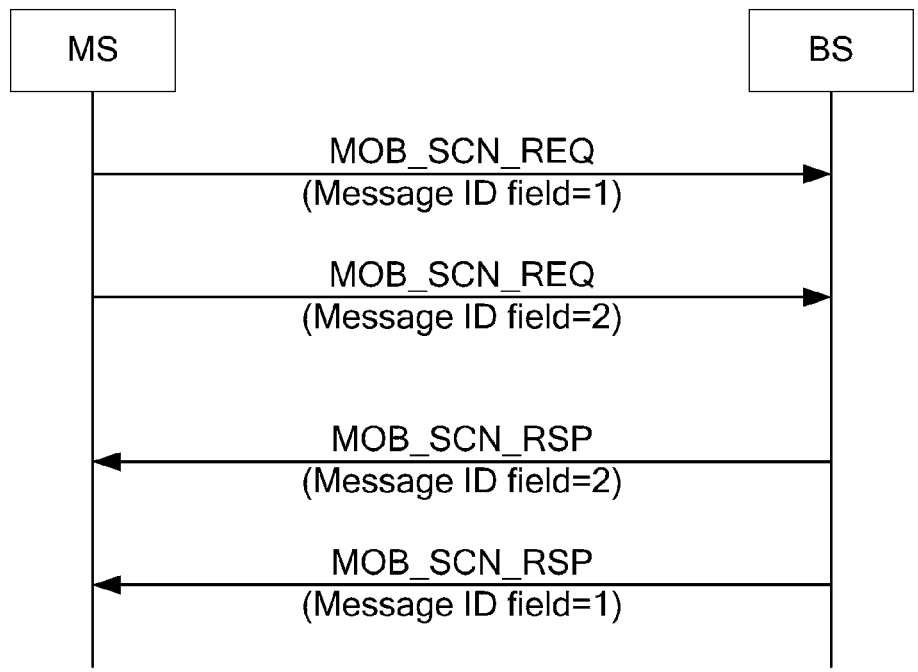
FIG. 8 shows multiple scanning processes initiated by an MS.

FIG. 8 shows multiple scanning processes initiated by an MS after a message ID field is added.

As shown in FIG. 8, the MS sends two MOB_SCN_REQ messages to a BS. The message ID field is set to 1 in one MOB_SCN_REQ message and to 2 in the other MOB_SCN_REQ message. The BS sends two MOB_SCN_RSP messages. The message ID field is set to 1 in one MOB_SCN_REQ message and to 2 in the other MOB_SCN_REQ message. After receiving the MOB_SCN_RSP messages, the MS may know that the MOB_SCN_RSP message with the message ID field 2 matches the MOB_SCN_REQ message with the message ID field 2, and that the MOB_SCN_RSP message with the message ID field 1 matches the MOB_SCN_REQ message with the message ID field 1. Thus, when an MS sends multiple MOB_SCN_REQ messages, the MS may judge which MOB_SCN_REQ message matches an MOB_SCN_RSP message according to the message ID field. The initiating of multiple scanning processes by the MS may be: initiating multiple scanning processes by the MS at the same time, or initiating multiple scanning processes in sequence by the MS.

Third embodiment: A mode indication field is further set in a scanning process message to indicate whether the scanning process message uses the BS Bitmap mode or BS Index mode. The mode indication filed is used to indicate which mode a current scanning process message uses. Subsequent scanning process messages will use the mode indicated by the mode indication field. It should be noted that a message may use either the BS Index mode or the BS Bitmap mode only. The message can select a proper mode according to the actual situation. The mode indication field may be a format indication bit (FMT bit), a field including multiple bits, or a bit in the mode indication field.

Fourth embodiment: This embodiment provides an apparatus for responding to a scanning request.

The apparatus comprises a receiving unit, a sending unit, and a sequence indicating unit, where: the receiving unit is adapted to receive an MOB_SCN_REQ message; the sending unit is adapted to send an MOB_SCN_RSP message; and the sequence indicating unit is adapted to map an information unit in the receiving unit.

Preferably, the apparatus further comprises an information unit, which is adapted to store BS IDs in the MOB_SCN_REQ message received by the receiving unit. The information unit may further include a mode indication unit, which is adapted to indicate a structure of the sequence indicating unit.

The information unit may further include a carrying indication unit, which is adapted to indicate whether the receiving unit includes the information unit.

The sequence indicating unit in this embodiment may be a BS Index unit or a BS Bitmap unit.

The BS Bitmap unit comprises a subunit, which is adapted to map the information unit. The location of the subunit corresponds to the sequence of the BS ID in the MOB_SCN_REQ message. The subunit is set to indicate whether the scanning message comprises the BS ID of the sequence. The number of subunits may be equal to the number of information units or number of Full BS IDs in the information unit.

The apparatus provided in this embodiment further comprises a reception/transmission identifying unit, which is adapted to match the MOB_SCN_RSP message sent by the sending unit with the MOB_SCN_REQ message received by the receiving unit.

Figure 9:
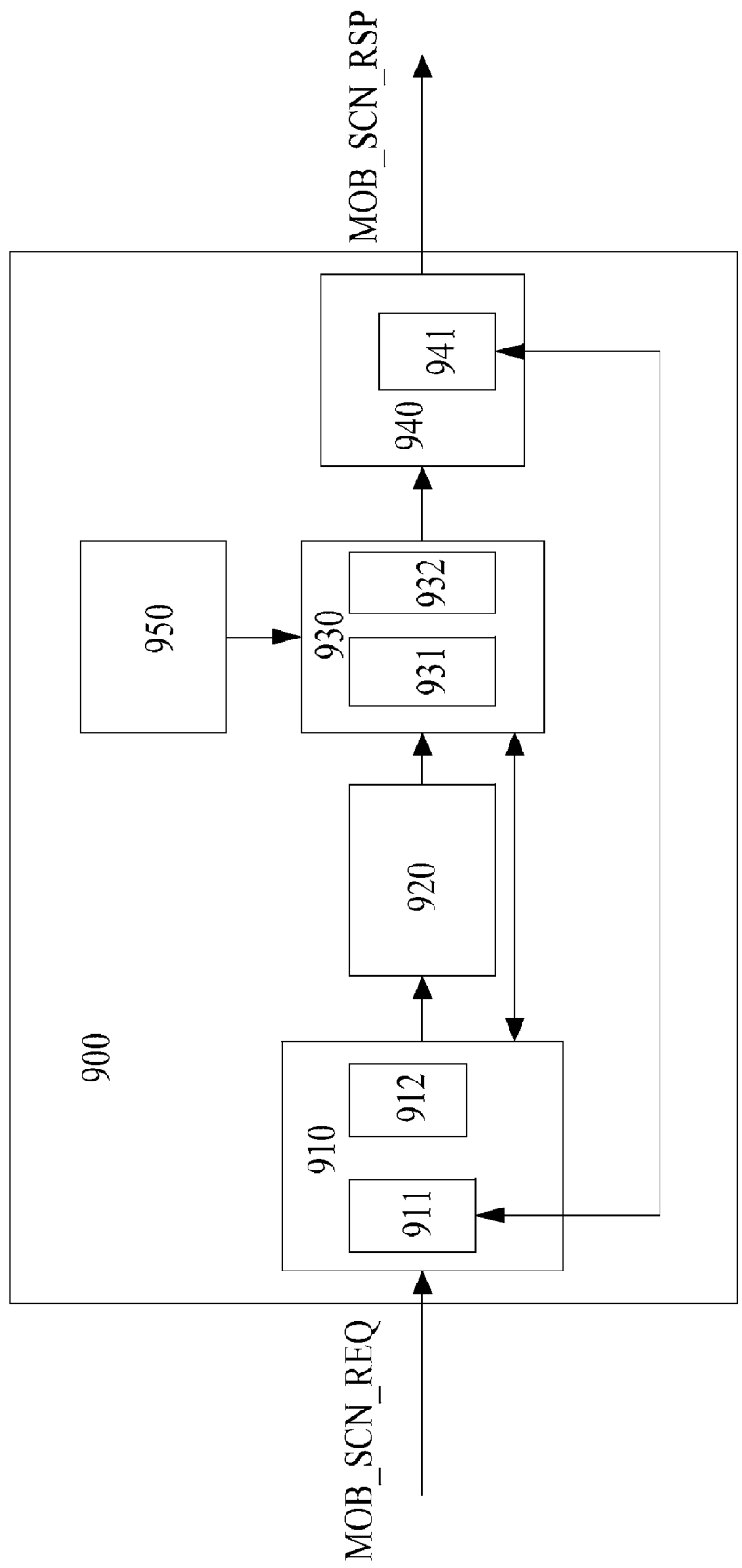
FIG. 9 shows a structure of an apparatus provided in a fourth embodiment of the present invention.

The following further describes the apparatus provided in this embodiment with reference to FIG. 9.

As shown in FIG. 9, 900 represents the apparatus; 910 represents the receiving unit; 920 represents the carrying indication unit; 930 represents the sequence indicating unit; 940 represents the sending unit; 950 represents the mode indication unit; 911 represents the reception/transmission identifying unit in the receiving unit; 912 represents the information unit; 931 represents the BS Bitmap unit; and 932 represents the BS Index unit.

The information unit comprises a carrying indication unit and a mode indication unit, and the sequence indicating unit comprises a BS Bitmap unit and a BS Index unit.

The receiving unit 910 receives an MOB_SCN_REQ message, and stores the BS ID in the MOB_SCN_REQ message in the information unit 912; the reception/transmission identifying unit 911 in the receiving unit stores the message ID field in the MOB_SCN_REQ message.

The carrying indication unit 920 receives a message from the receiving unit 910 and judges whether the information unit 912 exists; if so, the carrying indication unit 920 sends carrying indication information to the sequence indicating unit 930; after receiving the carrying indication information, the sequence indicating unit 930 receives the message from the receiving unit 910; the sequence indicating unit 930 is adapted to: map BS IDs in the information unit 912, obtain BS ID sequence indication information after the mapping, and send the BS ID sequence indication information to the sending unit 940. The sending unit 940 receives the BS ID sequence indication information, and sets the message ID field in the reception/transmission identifying unit 941 of the sending unit to a value that the is same as or corresponds to the value of the message ID field in the reception/transmission identifying unit 911 of the receiving unit. Then, the sending unit 940 sends an MOB_SCN_RSP message externally, where the MOB_SCN_RSP message carries the BS ID sequence indication information and the message ID field.

The sequence indicating unit 930 may use the structure of the BS Bitmap unit 931 or BS Index unit 932. The mode indication unit 950 sends mode indication information to the sequence indicating unit 930 to indicate whether the sequence indicating unit 930 uses the structure of the BS Bitmap unit 931 or the BS Index unit 932. It should be noted that only the BS Bitmap unit 931 or the BS Index unit 932 is available.

In practical applications, there may be one or multiple information units 912. When there are multiple information units 912, each of the information units is arranged in a sequence same as that of BS IDs in the MOB_SCN_REQ message.

The BS Bitmap unit 931 comprises a subunit, which is not illustrated in FIG. 9. The location of the subunit corresponds to the location of the information unit 912. The subunit is set to indicate whether the MOB_SCN_RSP message comprises contents of the information unit.

The BS Index unit 932 is set according to the location of an information unit among all the information units 912 that stores BS IDs that the apparatus 900 wants to carry in the MOB_SCN_RSP message. The number of BS Index units 932 is equal to the number of BS IDs that the apparatus 900 wants to carry in the MOB_SCN_REQ message and that are also included in the MOB_SCN_REQ message.

In FIG. 9, the units 920, 950, 911 and 941 are optional units.

Fifth embodiment: This embodiment provides a system for responding to a scanning request.

The system provided in this embodiment includes an MS, a BS, and a sequence indicating unit, where: the MS is adapted to send an MOB_SCN_REQ message; the BS is adapted to receive the MOB_SCN_REQ message and send an MOB_SCN_RSP message; and the sequence indicating unit is located in the BS and adapted to map the information unit in the MOB_SCN_REQ message.

Preferably, the system further comprises a mode indication unit, which is located in the BS and adapted to indicate the structure of the sequence indicating unit.

Preferably, the system further comprises a carrying indication unit, which is located in the BS and adapted to indicate whether the BS comprises the information unit.

Preferably, the system further comprises a reception/transmission identifying unit, which is located in the MS and BS and adapted to match the MOB_SCN_RSP message with the MOB_SCN_REQ message.

Figure 10:
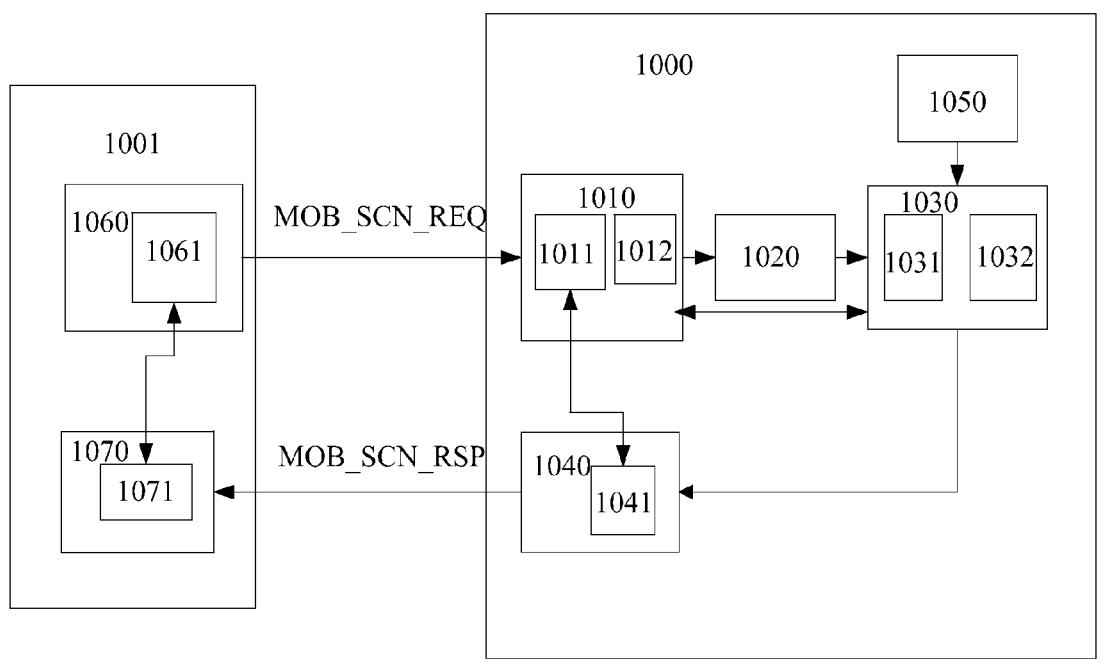
FIG. 10 is a structure of a system provided in a fifth embodiment of the invention.

The following further describes the system provided in this embodiment with reference to FIG. 10.

In FIG. 10, 1000 represents the BS; 1001 represents the MS; 1060 represents the sending unit of the MS; 1061 represents the reception/transmission identifying unit in the sending unit 1060 of the MS; 1070 represents the receiving unit of the MS; 1071 represents the reception/transmission identifying unit in the receiving unit 1070 of the MS; 1010 represents the receiving unit of the BS; 1011 represents the reception/transmission identifying unit in the receiving unit 1010 of the BS; 1012 represents the information unit; 1020 represents the carrying indication unit; 1030 represents the sequence indicating unit; 1031 represents the BS Bitmap unit; and 1032 represents the BS Index unit; 1040 represents the sending unit of the BS; 1041 represents the reception/transmission identifying unit in the sending unit 1040 of the BS; and 1050 represents the mode indication unit.

The internal structure of the BS 1000 shown in FIG. 10 corresponds to that of the apparatus 900 shown in FIG. 9 according to the last two digits of the numbers in the drawings and so is the mapping relation between the units. That is, the last two digits of the BS 1000 are the same as those of the apparatus 900 in the drawings, and so are the internal structures of the units represented by the numbers in the drawings and mapping relation between the units.

In FIG. 10, the sending unit 1060 of the MS 1001 sends an MOB_SCN_REQ message to the receiving unit 1010 of the BS 1000, where the MOB_SCN_REQ message carries a message ID field generated by the reception/transmission identifying unit 1061; the receiving unit 1070 of the MS 1001 receives an MOB_SCN_RSP message from the sending unit 1040 of the BS 1000, and stores a message ID field carried in the MOB_SCN_RSP message in the reception/transmission identifying unit 1071; the reception/transmission identifying unit 1071 receives the message ID field from the reception/transmission identifying unit 1061, and judges whether the message ID field carried in the MOB_SCN_RSP message is the same as or corresponds to the message ID field sent from the reception/transmission identifying unit 1061; if so, the MOB_SCN_RSP message matches the MOB_SCN_REQ message; otherwise, the MOB_SCN_RSP message does not match the MOB_SCN_REQ message.

In FIG. 10, the units 1020, 1050, 1011, 1041, 1061 and 1071 are optional units.

For the sequence indicating unit, BS Bitmap unit, BS Index unit, mode indication unit, carrying indication unit, reception/transmission identifying unit and other units in the apparatus provided in the fourth embodiment and system provided in the fifth embodiment, the internal structures are set according to the method provided in an embodiment of the present invention, and will not be further described.

According to the preceding solution, an MOB_SCN_RSP message is optimized. For BS IDs that are already carried in an MOB_SCN_REQ message, the MOB_SCN_RSP message provided in embodiments of the present invention is represented in BS Index mode or BS Bitmap mode. The sequences used in BS Index mode and BS Bitmap mode are sequences of the BS IDs in the MOB_SCN_REQ message. When the MOB_SCN_RSP message is represented in BS Index mode or BS Bitmap mode, each of BS IDs that are already carried in the MOB_SCN_REQ message is represented by 8 bits or 1 bit only. In contrast, 48 bits are needed in Full BS ID mode in the prior art. Thus, the method provided in embodiments of the present invention can greatly improve the utilization of air interface resources.

In embodiments of the present invention, a message ID field is further set to match the MOB_SCN_RSP message with the MOB_SCN_REQ message, so that the MS or BS can initiate multiple scanning processes without errors during the matching between the MOB_SCN_RSP message and the MOB_SCN_REQ message.

In embodiments of the present invention, a mode indication mode is further set to indicate whether a current scanning process message uses the BS Bitmap mode or BS Index mode, which can achieve the compatibility between the BS Bitmap mode and the BS Index mode. Thus, different modes may be selected according to different scenarios, and the utilization of air interface resources may be maximized.

Through the preceding description of embodiments of the present invention, it is understandable to those skilled in the art that embodiments of the present invention may be implemented by hardware or by software in combination with a necessary hardware platform. Thus, the technical solution of the present invention may be made into software. The software may be stored in a non-volatile storage medium (for example, a CD-ROM, a USB disk, or a mobile hard disk), and include several instructions that instruct a data processing device (such as a personal computer, a server, or a network device) to execute the method provided in each embodiment of the present invention.

Although the present invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for responding to a scanning request, comprising:
   receiving, by a serving base station (BS), a mobile scan request MOB_SCN_REQ message sent by a mobile station (MS); and
   sending, by the serving BS, a mobile scanning response message MOB_SCN_RSP to the MS,
   wherein a BS Bitmap field is carried in the MOB_SCN_RSP message, the BS Bitmap field being configured to include a plurality of bits, and
   wherein, for each bit in the plurality of bits, a position of the bit is configured to identify one BS in a plurality of BSs available to the MS for scanning, and a value of the bit is configured to indicate whether the available BS is selected by the serving BS for scanning by the MS.

2. The method for responding to a scanning request according to claim 1, wherein a quantity of bits in the BS Bitmap field is equals a quantity of BS IDs.

3. The method for responding to a scanning request according to claim 1, wherein a message ID field is set in the MOB_SCN_REQ message and the MOB_SCN_RSP message.

4. An apparatus for responding to a scanning request comprising:
   a receiving unit configured to receive an MOB_SCN_REQ message sent by a mobile station (MS); and
   a sending unit configured to send an MOB_SCN_RSP message to the MS,
   wherein a BS Bitmap field is carried in the MOB_SCN_RSP message, the BS Bitmap field being configured to include a plurality of bits, and
   wherein, for each bit in the plurality of bits, a position of the bit is configured to identify one BS in a plurality of BSs available to the MS for scanning, and a value of the bit is configured to indicate whether the available BS is selected for scanning by the MS.

5. The method for responding to a scanning request according to claim 1, wherein the position of the bit is configured to identify one available BS by mapping to a corresponding position of a BS Identification (BS ID) of the same available BS in the MOB_SCN_REQ message.

6. The method for responding to a scanning request according to claim 1, wherein the position of the bit in the bitmap field in the MOB_SCN_RSP message is configured to identify one available BS by matching a position of a bit in a bitmap field in the MOB_SCN_REQ message from the MS.

7. The apparatus for responding to a scanning request according to claim 4, wherein the position of the bit is configured to identify one available BS by mapping to a corresponding position of a BS Identification (BS ID) of the same available BS in the MOB_SCN_REQ message.

8. The apparatus for responding to a scanning request according to claim 4, wherein the position of the bit in the bitmap field in the MOB_SCN_RSP message is configured to identify one available BS by matching a position of a bit in a bitmap field in the MOB_SCN_REQ message from the MS.

* * * * *